United States Patent
Jigalur et al.

(10) Patent No.: US 12,461,795 B2
(45) Date of Patent: Nov. 4, 2025

(54) MIGRATING WORKLOADS ACROSS CONTAINER CLUSTERS WITH DIFFERENT PROCESSOR ARCHITECTURES

(71) Applicant: VMware LLC, Palo Alto, CA (US)

(72) Inventors: Pradeep Shanmukha Jigalur, Hubli (IN); Christopher John Schaefer, Venice, FL (US); Rafael Brito, Austin, TX (US); Eduardo Rodrigues De Oliveira, Round Rock, TX (US); Astha Agarwal, Moradabad (IN); Prakash Mishra, Bangalore (IN); Frances Gold, Eugene, OR (US); Subhani Shaik, Nuzvid (IN); Divya Rani, Santa Clara, CA (US)

(73) Assignee: VMware LLC, Palo Alto, CA (US)

( * ) Notice: Subject to any disclaimer, the term of this patent is extended or adjusted under 35 U.S.C. 154(b) by 390 days.

(21) Appl. No.: 18/079,024

(22) Filed: Dec. 12, 2022

(65) Prior Publication Data

US 2024/0012693 A1   Jan. 11, 2024

(30) Foreign Application Priority Data

Jul. 5, 2022   (IN) .............................. 202241038498

(51) Int. Cl.
G06F 9/455 (2018.01)
G06F 9/50 (2006.01)

(52) U.S. Cl.
CPC ........ *G06F 9/5088* (2013.01); *G06F 9/45558* (2013.01); *G06F 2009/45562* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 2022/0116289 A1* | 4/2022 | Ramanathan | H04L 41/5051 |
| 2022/0345367 A1* | 10/2022 | Kolla | H04L 41/0806 |
| 2024/0419506 A1* | 12/2024 | Mohana Narayanamurthy | G06F 9/505 |

* cited by examiner

*Primary Examiner* — Craig C Dorais
(74) *Attorney, Agent, or Firm* — Kim & Stewart LLP

(57) ABSTRACT

Techniques for migrating a workload between two container clusters (i.e., source and destination container clusters) that use different processor architectures are provided. In one set of embodiments, these techniques involve implementing a migration container cluster that (1) creates a backup of the workload from the source container cluster, where the backup includes metadata regarding one or more objects or resources of the workload, and (2) restores the backup on the destination container cluster, where the restoring causes a worker node of the destination container cluster to automatically retrieve, from an image repository, a container image for the workload that is specific to the second processor architecture and deploy the container image as a running container on the worker node.

21 Claims, 3 Drawing Sheets

MIGRATING WORKLOADS ACROSS CONTAINER CLUSTERS WITH DIFFERENT PROCESSOR ARCHITECTURES

RELATED APPLICATIONS

Benefit is claimed under 35 U.S.C. 119(a)-(d) to Foreign application Ser. No. 20/2241038498 filed in India entitled "MIGRATING WORKLOADS ACROSS CONTAINER CLUSTERS WITH DIFFERENT PROCESSOR ARCHITECTURES", on Jul. 5, 2022, by VMware, Inc., which is herein incorporated in its entirety by reference for all purposes.

BACKGROUND

Unless otherwise indicated, the subject matter described in this section is not prior art to the claims of the present application and is not admitted as being prior art by inclusion in this section.

Kubernetes is an open-source software platform for orchestrating the deployment, scheduling, and scaling of containerized workloads. A Kubernetes cluster comprises a group of physical or virtual machines, referred to as nodes, on which an instance of the Kubernetes platform and the containerized workloads it orchestrates are placed and run.

For various reasons, a user or organization running a containerized workload on a first Kubernetes cluster that employs a first processor architecture may wish to migrate the workload to a second Kubernetes cluster that employs a second processor architecture different from the first. For example, the second Kubernetes cluster may exhibit better performance or power efficiency by virtue of using the second processor architecture, or the second Kubernetes cluster may reside in a different cloud infrastructure that the user/organization would like to transition to. Unfortunately, with existing approaches, this migration process must be handled via an entirely manual process that is time consuming, burdensome, and error prone.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Example Environment and Solution Overview

Embodiments of the present disclosure are directed to techniques for migrating containerized workloads across container clusters with different processor architectures. As used herein, a "container cluster" is a cluster of physical or virtual machines (i.e., nodes) that are configured to run an instance of a container orchestration platform and the containerized workloads orchestrated/managed by that platform. An example of a container orchestration platform is Kubernetes, and an example of a container cluster is a Kubernetes cluster. A "containerized workload" (also referred to herein as simply a "workload") is a software application whose program code and dependencies are packaged into a standardized format, known as a container image, that can be uniformly run in different computing environments. A running instance of a container image is a container. The "processor architecture" of a container cluster refers to the microarchitectural design and/or instruction set of the central processing units (CPUs) used by the nodes of that cluster. Examples of processor architectures include x86-64, ARM, and so on.

Figure 1:
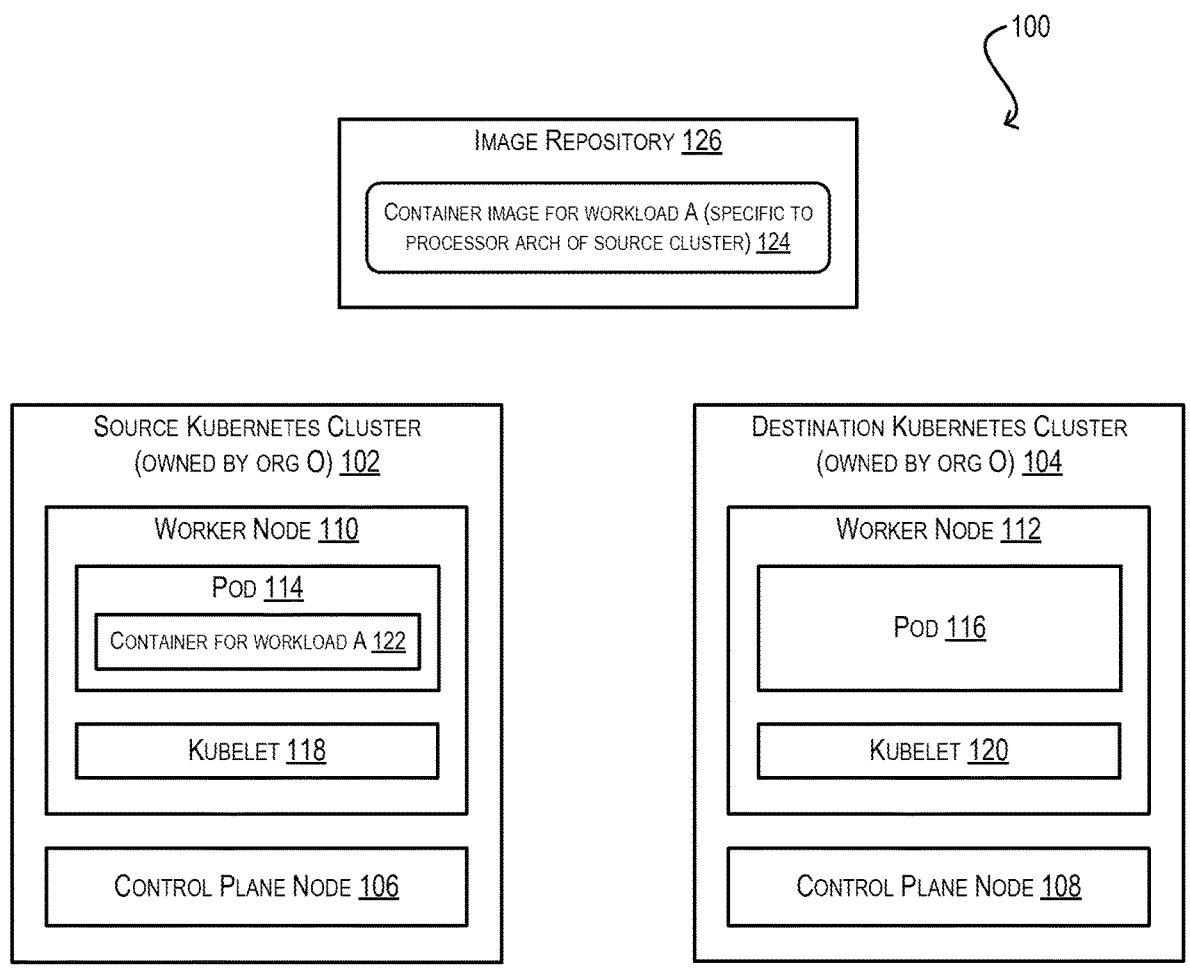
FIG. 1 depicts an example environment.

FIG. 1 is a simplified block diagram illustrating an example environment 100 in which the techniques of the present disclosure may be implemented. As shown, environment 100 comprises a first (i.e., source) Kubernetes cluster 102 and a second (i.e., destination) Kubernetes cluster 104 that are owned by an organization "O". In one set of embodiments, source and destination clusters 102 and 104 may run on the same computing infrastructure platform, such as the cloud infrastructure of a single cloud service provider. In other embodiments, source and destination clusters 102 and 104 may run on entirely different computing infrastructure platforms. For example, source cluster 102 may run on Amazon's AWS cloud infrastructure and destination cluster 102 may run on Microsoft's Azure cloud infrastructure. Alternatively, one of the two clusters may run on an on-premises infrastructure, such as a data center owned and managed by organization O.

Each cluster 102/104 includes at least one control plane node 106/108 that is configured to manage the overall operation of the cluster. Although a complete description of the functionality of control plane node 106/108 is beyond the scope of the present disclosure, this control plane node can run, among other things, an application programming interface (API) server that exposes the Kubernetes API to end-users/clients and an "etcd" database that stores the state of the cluster's Kubernetes objects and resources.

In addition, each cluster 102/104 includes at least one worker node 110/112 that is configured to run the containerized workloads deployed on that cluster. This worker node includes one or more pods 114/116 that comprise containers executing the cluster's workloads and a node agent (i.e., "kubelet") 118/120 that is configured to, among other things, manage the operation of the worker node's pods/containers.

In the example of FIG. 1, pod 114 of worker node 110 in source cluster 102 includes a container 122 executing a workload "A" and the container's corresponding container image 124 is held in an image repository 126. Because container image 124 comprises compiled program code, container image 124 is specific to the processor architecture of worker node 110/source cluster 102. For example, if worker node 110 uses x86-64 CPUs, container image 124 will be an x86-64 image, which means that it includes program code specifically compiled to run on the x86-64 architecture. This is necessary for the container image to properly run on the CPUs of worker node 110.

As noted in the Background section, in some scenarios a user or organization may wish to migrate a containerized workload from a source Kubernetes cluster whose worker nodes use a first processor architecture to a destination Kubernetes cluster whose worker nodes use a second processor architecture different from the first. For example, with respect to FIG. 1, assume worker node 110 of source cluster 102 uses x86-64 CPUs, worker node 112 of destination cluster 104 uses ARM CPUs, and organization O wishes to migrate workload A (corresponding to container 122/container image 124) from source cluster 102 to destination cluster 104. According to one approach for handling this migration, a human actor such as an administrator can manually (1) create, for workload A, a new container image specific to the ARM architecture used by worker node 112 of destination cluster 104, (2) fetch cluster object and resource configurations for workload A from source cluster 102, (3) modify the cluster object/resource specifications to point to the new container image created at (1), and (4) apply the modified cluster object/resource specifications on destination cluster 104. However, due to the significant number of manual steps required, this approach is time consuming, burdensome, and error prone.

Figure 2:
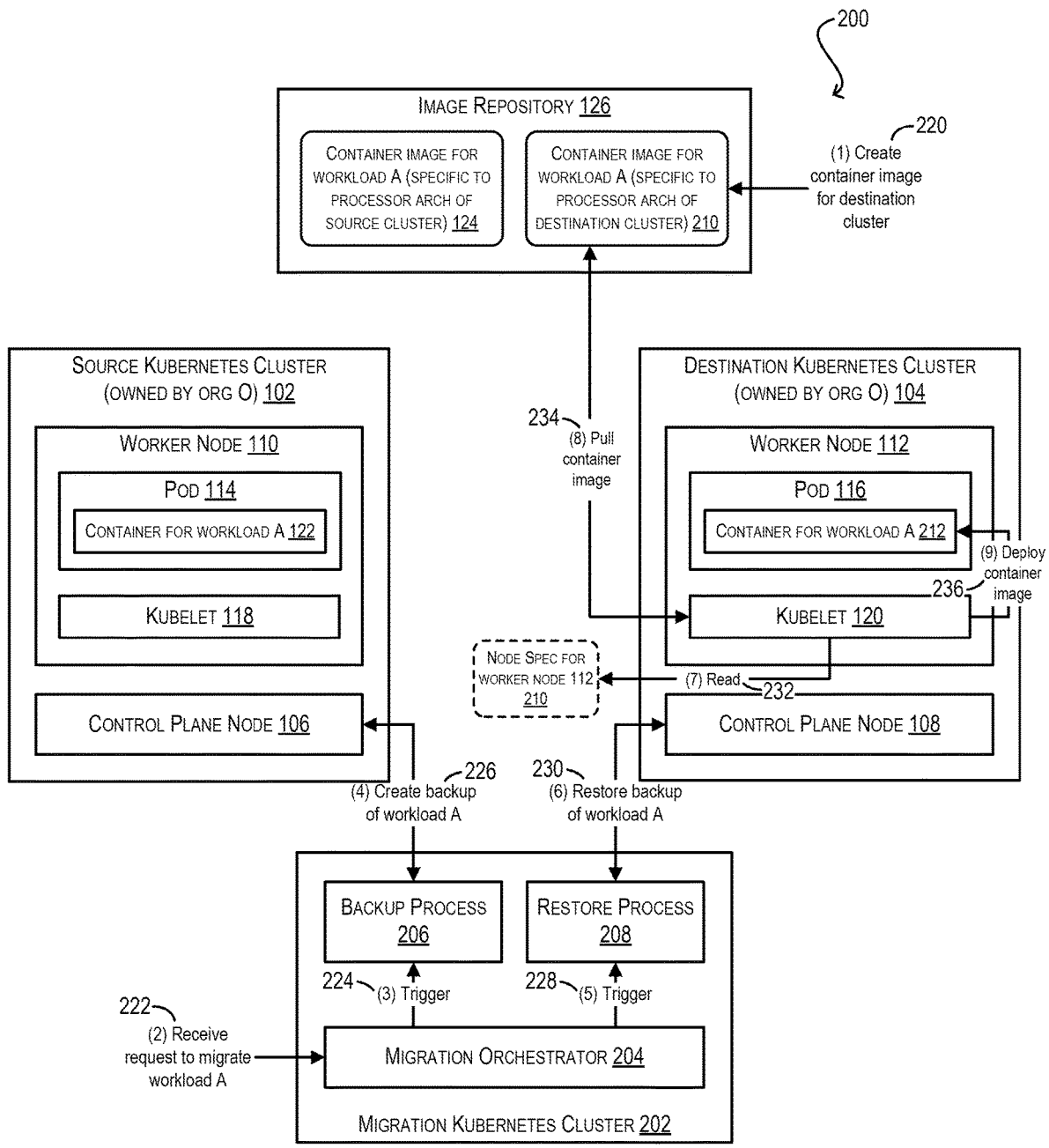
FIG. 2 depicts an enhanced version of the environment of FIG. 1 including a migration cluster according to certain embodiments.

To address the foregoing and other related issues, FIG. 2 depicts an enhanced version of environment 100 (i.e., environment 200) that includes a novel "migration" Kubernetes cluster 202 comprising a migration orchestrator 204, a backup process 206, and a restore process 208, as well as a high-level workflow comprising steps (1)-(9) (reference numerals 220-236) that may be carried out within environment 200 to facilitate the migration of workload A from source cluster 102 to destination cluster 104 according to certain embodiments. Migration cluster 202 may run on a computing infrastructure platform that is separate from the computing infrastructure platforms hosting source cluster 102 and destination cluster 104, or alternatively may run on the same computing infrastructure platform as one (or both) of clusters 102 and 104.

Starting with step (1) (reference numeral 220), a new container image 210 for workload A that is specific to the processor architecture of worker node 112 of destination cluster 104 can be created and stored in image repository 126. This step may be performed by, e.g., a user/administrator of organization O or by an automated agent.

At step (2) (reference numeral 222), migration orchestrator 204 of migration cluster 202 can receive a request to migrate workload A from source cluster 102 to destination cluster 104. In response, migration orchestrator 204 can trigger backup process 206 (step (3); reference numeral 224), which can interact with control plane node 106 of source cluster 102 to create a backup of the metadata for workload A and can store this backup in an intermediary storage location, such as a cloud object store separate from migration cluster 202 (not shown) (step (4); reference numeral 226).

Once the backup has been created and stored, migration orchestrator 204 can trigger restore process 208 (step (5); reference numeral 228), which can retrieve the backup from the intermediary storage location and can interact with control plane node 108 of destination cluster 104 to apply the metadata in the backup to destination cluster 104, thereby restoring workload A on that cluster (step (6); reference numeral 230). As part of this restore process, worker node 112 of destination cluster 104 will receive from control plane node 108 an instruction to deploy the pod and container for workload A thereon, which will cause kubelet 120 of worker node 112 to automatically read the processor architecture type of worker node 112 from a node specification object 210 associated with worker node 112 (step (7); reference numeral 232), retrieve the container image specific to that processor architecture from image repository 126 (i.e., container image 210 created at step (1)) (step (8); reference numeral 234), and deploy the container image as a running container 212 within a pod of worker node 112 (e.g., pod 116) (step (9); reference numeral 236).

Finally, once the restoration of the backup on destination cluster 104 is done, migration orchestrator 204 can return an acknowledgement to the original requestor that the migration of workload A has been completed (not shown) and the workflow can end.

With the high-level solution architecture and workflow shown in FIG. 2, migration cluster 202 can seamlessly automate the end-to-end migration of a workload across clusters with different processor architectures, with minimal human intervention. Accordingly, this approach makes it easy for organizations to transition their containerized workloads between completely different computing infrastructure platforms (such as different cloud infrastructures), which can advantageously lead to lower hardware costs, improved energy efficiency, and/or greater overall performance.

It should be appreciated that FIGS. 1 and 2 are illustrative and not intended to limit embodiments of the present disclosure. For example, although these figures specifically depict Kubernetes clusters for purposes of explanation and illustration, the techniques of the present disclosure may be applied to other types of clusters that are configured to execute containerized workloads. Accordingly, all references to "Kubernetes cluster" herein may be substituted with the more generic terms "container cluster" or "cluster."

Further, although FIGS. 1 and 2 depict a particular arrangement of entities and components, other arrangements are possible (e.g., the functionality attributed to a particular entity/component may be split into multiple entities/components, entities/components may be combined, etc.). Yet, further, the various entities/components shown may include subcomponents and/or functions that are not specifically described. One of ordinary skill in the art will recognize other variations, modifications, and alternatives.

3. Migration Flowchart

Figure 3:
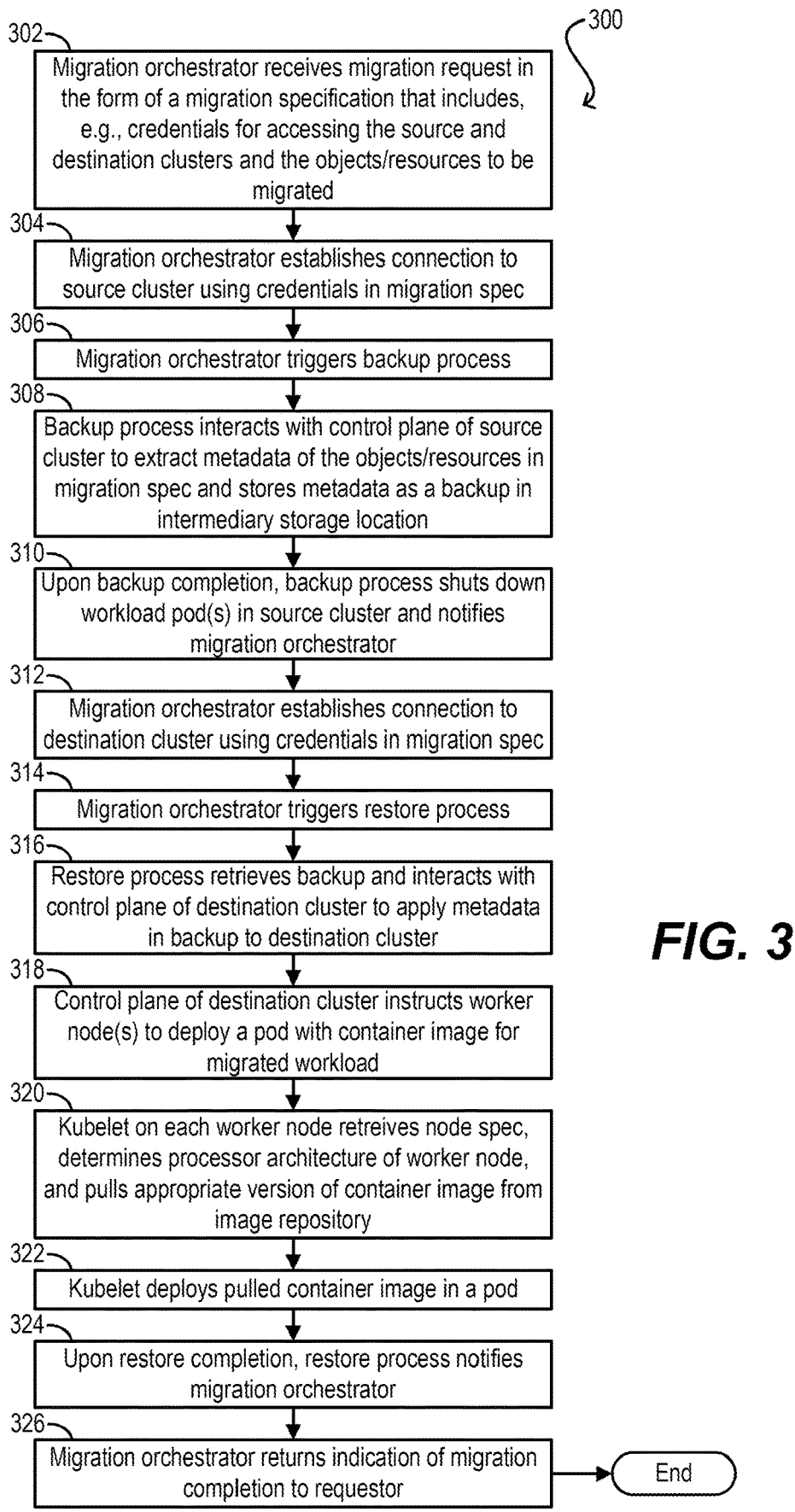
FIG. 3 depicts a migration flowchart that may be carried out by the migration cluster of FIG. 2 according to certain embodiments.

FIG. 3 depicts a flowchart 300 that provides additional details regarding the processing that may be performed by migration cluster 202 of FIG. 2 for migrating a workload from a source cluster (such as source cluster 102) to a destination cluster (such as destination cluster 104) according to certain embodiments. Flowchart 300 assumes that the worker node(s) on which the workload runs in the source cluster use a processor architecture that is different from the worker node(s) in the destination cluster. In addition, flowchart 300 assumes that a container image for the workload that is specific to the processor architecture of the destination cluster has been created and stored in an image repository that is accessible by both the source and destination clusters (e.g., image repository 126).

Starting with block 302, the migration orchestrator of the migration cluster can receive a request to migrate the workload in the form of a migration specification. This migration specification can include, e.g., credentials for accessing the source cluster, credentials for accessing the destination cluster, and information specifying the objects/resources to be migrated (e.g., a Kubernetes namespace encompassing the objects/resources of the workload, a list of the workload's objects/resources, etc.).

At block 304, migration orchestrator can establish a connection to the source cluster using the credentials included in the migration specification. The migration orchestrator can then trigger the backup process (block 306), which can run as a workload on the migration cluster itself or at a different location, such as on the source cluster. Upon being triggered, the backup process can interact with the control plane node(s) of the source cluster via, e.g., Kubernetes APIs to extract metadata regarding the objects/resources specified in the migration specification and store the extracted metadata as a backup in an intermediary storage location (block 308). In a particular embodiment, the metadata can take the form of YAML files that include information for those objects/resources as stored in the source cluster's etcd database.

Once the backup is complete, the backup process can shut down the workload pods on the source cluster and inform the migration orchestrator (block 310), which can subsequently establish a connection with the destination cluster using the credentials included in the migration specification (block 312) and trigger the restore process (block 314). Like the backup process, the restore process can run as a workload on the migration cluster itself or elsewhere, such as on the destination cluster.

Upon being triggered, the restore process can retrieve the backup taken by the backup process from the intermediary storage location and can interact with the control plane node(s) of the destination cluster via, e.g., Kubernetes APIs to apply the metadata in the backup to the destination cluster, thereby restoring the workload on the destination cluster (block 316). As part of this restore process, the control plane node(s) can instruct one or more worker nodes of the destination cluster to deploy a pod associated with the container image for running the workload (block 318). In response, the kubelet on each worker node can retrieve the worker node's node specification, determine, from the node specification, the processor architecture used by the worker node, and pull the container image specific to that processor architecture from the image repository (block 320). For instance, the following is a portion of an example node specification that indicates the ARM processor architecture:
apiVersion: v1
kind: Node
metadata:
   labels:
   kubernetes.io/arch: arm Listing 1

The kubelet can thereafter run the container image pulled from the image repository as a container within a pod of the worker node (block 322).

Once the workload's pods and containers have been successfully deployed and started on the destination cluster, the restore process can inform the migration orchestrator that the restore process is done (block 324). Finally, at block 326, migration orchestrator can report completion of the workload migration to the original requestor and the flowchart can end. Although not shown, in some embodiments migration cluster 200 may be automatically decommissioned at the conclusion of the migration so that the computing resources allocated to the migration cluster may be reused for other purposes.

Certain embodiments described herein can employ various computer-implemented operations involving data stored in computer systems. For example, these operations can require physical manipulation of physical quantities-usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid-state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:
   receiving, by a migration container cluster, a request to migrate a workload from a source container cluster to a destination container cluster, wherein the source container cluster uses a first processor architecture and wherein the destination container cluster uses a second processor architecture different from the first processor architecture; and creating, by the migration container cluster in response to the request, a backup of the workload from the source container cluster, the backup including metadata regarding one or more objects or resources of the workload; and restoring, by the migration container cluster, the backup of the workload on the destination container cluster, wherein the restoring causes a worker node of the destination container cluster to automatically:

retrieve, from an image repository, a container image for the workload that is specific to the second processor architecture; and deploy the container image as a running container on the worker node.

2. The method of claim 1 wherein the request comprises a migration specification that includes access credentials for the source container cluster, access credentials for the destination container cluster, and a list of the one or more objects or resources.

3. The method of claim 1 wherein the worker node retrieves the container image specific to the second processor architecture based on a node specification associated with the worker node that identifies the second processor architecture.

4. The method of claim 1 wherein the source container cluster and the destination container cluster reside on different cloud infrastructures.

5. The method of claim 1 wherein the migration container cluster is automatically decommissioned once the backup has been restored on the destination container cluster.

6. The method of claim 1 wherein the backup is stored in an intermediary storage location separate from the migration container cluster prior to being restored.

7. The method of claim 1 wherein the migration container cluster, the source container cluster, and the destination container cluster are Kubernetes clusters.

8. A non-transitory computer readable storage medium having stored thereon program code executable by a migration container cluster, the program code embodying a method comprising:

receiving a request to migrate a workload from a source container cluster to a destination container cluster, wherein the source container cluster uses a first processor architecture and wherein the destination container cluster uses a second processor architecture different from the first processor architecture; and creating, in response to the request, a backup of the workload from the source container cluster, the backup including metadata regarding one or more objects or resources of the workload; and restoring the backup of the workload on the destination container cluster, wherein the restoring causes a worker node of the destination container cluster to automatically:

retrieve, from an image repository, a container image for the workload that is specific to the second processor architecture; and deploy the container image as a running container on the worker node.

9. The non-transitory computer readable storage medium of claim 8 wherein the request comprises a migration specification that includes access credentials for the source container cluster, access credentials for the destination container cluster, and a list of the one or more objects or resources.

10. The non-transitory computer readable storage medium of claim 8 wherein the worker node retrieves the container image specific to the second processor architecture based on a node specification associated with the worker node that identifies the second processor architecture.

11. The non-transitory computer readable storage medium of claim 8 wherein the source container cluster and the destination container cluster reside on different cloud infrastructures.

12. The non-transitory computer readable storage medium of claim 8 wherein the migration container cluster is automatically decommissioned once the backup has been restored on the destination container cluster.

13. The non-transitory computer readable storage medium of claim 8 wherein the backup is stored in an intermediary storage location separate from the migration container cluster prior to being restored.

14. The non-transitory computer readable storage medium of claim 8 wherein the migration container cluster, the source container cluster, and the destination container cluster are Kubernetes clusters.

15. A migration container cluster comprising:

a processor; and a non-transitory computer readable medium having stored thereon program code that causes the processor to receive a request to migrate a workload from a source container cluster to a destination container cluster, wherein the source container cluster uses a first processor architecture and wherein the destination container cluster uses a second processor architecture different from the first processor architecture; and create, in response to the request, a backup of the workload from the source container cluster, the backup including metadata regarding one or more objects or resources of the workload; and restore the backup of the workload on the destination container cluster, wherein the restoring causes a worker node of the destination container cluster to automatically:

retrieve, from an image repository, a container image for the workload that is specific to the second processor architecture; and deploy the container image as a running container on the worker node.

16. The migration container cluster of claim 15 wherein the request comprises a migration specification that includes access credentials for the source container cluster, access credentials for the destination container cluster, and a list of the one or more objects or resources.

17. The migration container cluster of claim 15 wherein the worker node retrieves the container image specific to the second processor architecture based on a node specification associated with the worker node that identifies the second processor architecture.

18. The migration container cluster of claim 15 wherein the source container cluster and the destination container cluster reside on different cloud infrastructures.

19. The migration container cluster of claim 15 wherein the migration container cluster is automatically decommissioned once the backup has been restored on the destination container cluster.

20. The migration container cluster of claim 15 wherein the backup is stored in an intermediary storage location separate from the migration container cluster prior to being restored.

21. The migration container cluster of claim 15 wherein the migration container cluster, the source container cluster, and the destination container cluster are Kubernetes clusters.

* * * * *